(No Model.) 3 Sheets—Sheet 1.
C. SPIRO.
TYPE WRITING MACHINE.
No. 534,585. Patented Feb. 19, 1895.
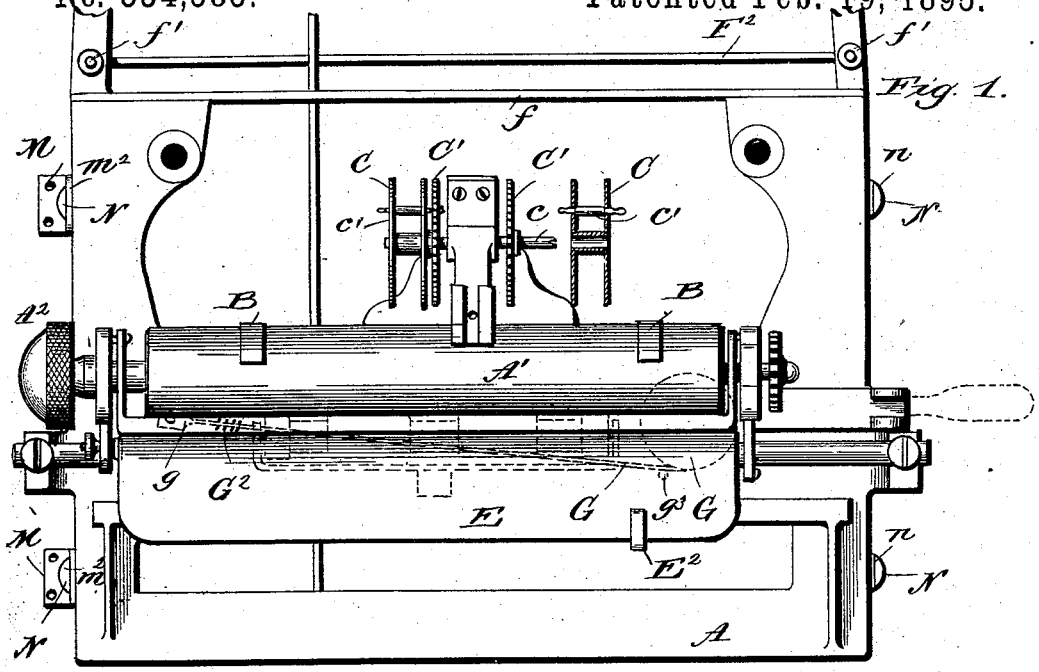
Fig. 1.
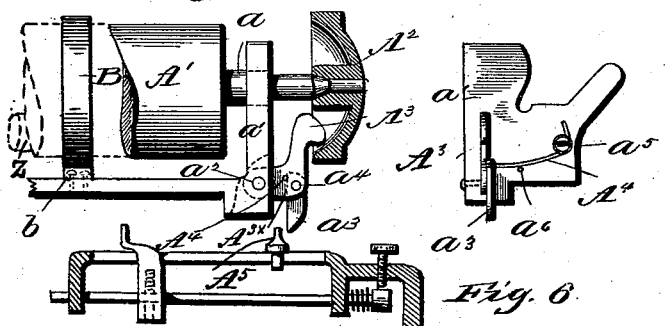
Fig. 2. Fig. 3.  Fig. 4.
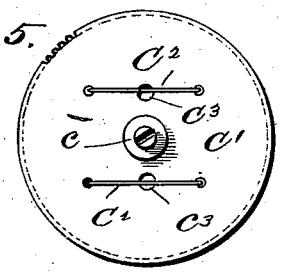
Fig. 5.
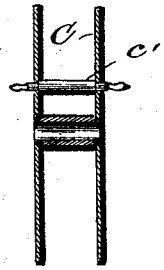
Fig. 6.
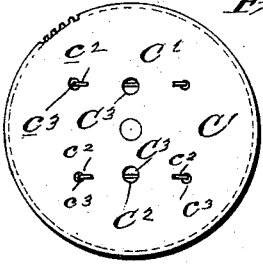
Fig. 7.
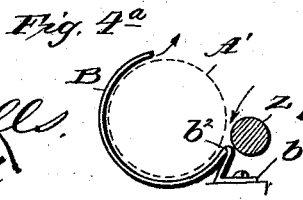
Fig. 4ª
Witnesses
L. C. Hills.
E. H. Bond.
Inventor
Charles Spiro.
by E. B. Stocking
Attorney
THE NORRIS PETERS CO., PHOTO-LITHO., WASHINGTON, D. C.

(No Model.)  3 Sheets—Sheet 2.
C. SPIRO.
TYPE WRITING MACHINE.
No. 534,585.  Patented Feb. 19, 1895.
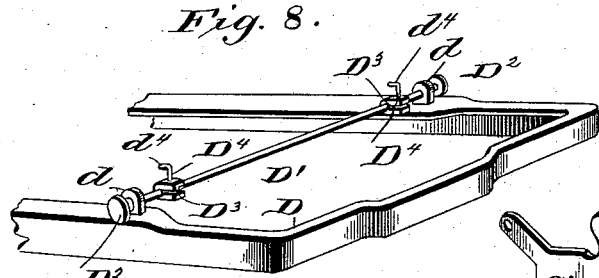
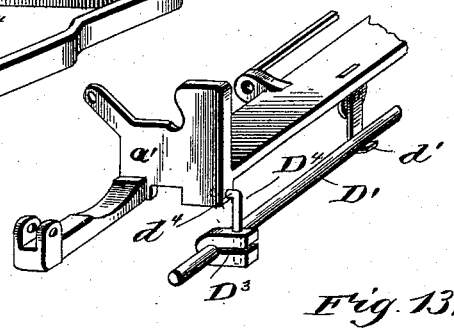
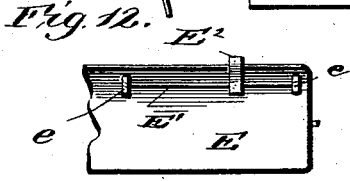
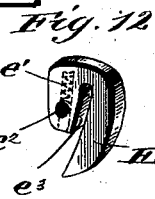
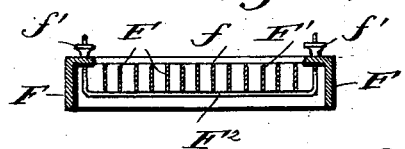
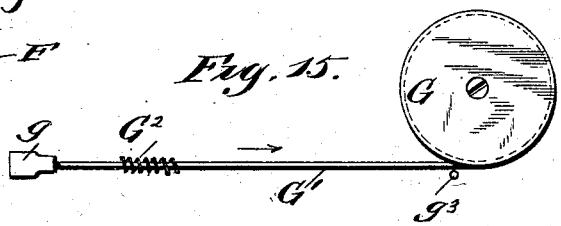
Witnesses:
L. C. Hills.
E. H. Bond
Inventor:
Charles Spiro.
by E. B. Stocking
Attorney (No Model.) 3 Sheets—Sheet 3.
C. SPIRO.
TYPE WRITING MACHINE.
No. 534,585. Patented Feb. 19, 1895.
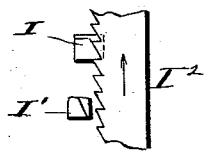
Fig. 17.
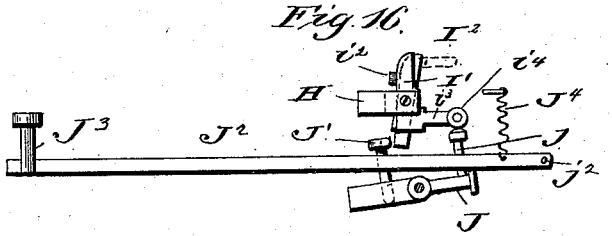
Fig. 16.
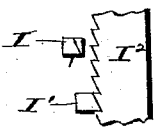
Fig. 19.
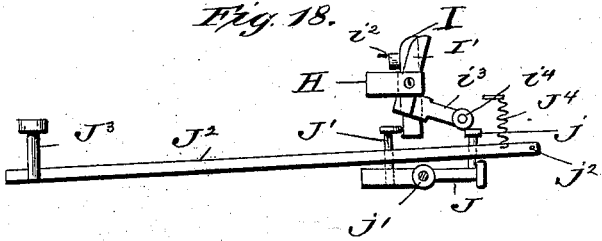
Fig. 18.
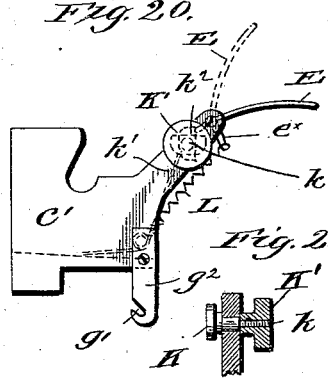
Fig. 20.
Fig. 21.
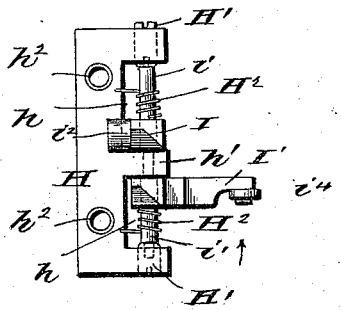
Fig. 22.
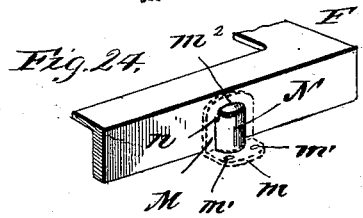
Fig. 21ª. Fig. 24.
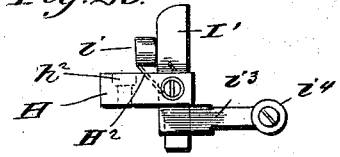
Fig. 23.
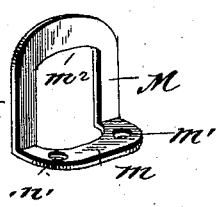
Fig. 25.
Witnesses
L. C. Hills
E. H. Bond
Inventor
Charles Spiro.
by E. B. Stocking
Attorney
THE NORRIS PETERS CO., PHOTO-LITHO., WASHINGTON, D. C.

UNITED STATES PATENT OFFICE.

CHARLES SPIRO, OF NEW YORK, N. Y.

TYPE-WRITING MACHINE.

SPECIFICATION forming part of Letters Patent No. 534,585, dated February 19, 1895.

Application filed August 11, 1892. Serial No. 442,758. (No model.) Patented in England August 17, 1892, No. 14,893.

*To all whom it may concern:*

Be it known that I, CHARLES SPIRO, a citizen of the United States, residing at New York, in the county of New York, State of New York, have invented certain new and useful Improvements in Type-Writing Machines, (parts of which are disclosed in the English Patent No. 14,893, dated August 17, 1892,) of which the following is a specification, reference being had therein to the accompanying drawings.

This invention has relation to certain new and useful improvements in type-writing machines and it has for its objects, among others, to provide improved dog or pawl-mechanism; to provide simple means whereby any one can readily pack the machine for shipment and to hold the key-levers and type-bars against movement as well as for holding the carriage in such a manner that it cannot move relatively to the other parts; to provide an improved ribbon gear-wheel, an improved margin-guard or guide and an improved paper-table.

It has for a further object the provision of a novel paper-guide around the platen; also a novel means for fastening the machine onto the base-board or packing case together with means for temporarily locking the paper-table in an upright position to facilitate the easy removal of the platen when necessary. I also provide a simplified construction of bell-hammer.

Other objects and advantages of the invention will appear in the following description and the novel features thereof will be particularly pointed out in the claims.

The improvements hereinafter referred to relate to type-writing machines illustrated and more particularly described in its general construction in Patent No. 447,438, granted March 3, 1891, and therefore a particular description of several parts of the machine as herein shown will be unnecessary.

While the constructions hereinafter described constitute what I, at present, consider the preferable form for carrying out my present invention, still I do not confine myself to the exact details of construction hereinafter shown and described as I may alter the same in any manner and to any extent and within the skill of persons conversant in the construction of type writing machines.

The invention in its preferable form is illustrated in the accompanying drawings, which, with the letters of reference marked thereon, form a part of this specification, and in which—

Figure 1 is a plan with portions removed and parts broken away and others in section, of a machine embodying my present improvements. Fig. 2 is a detail partly in section and partly in elevation of the bell hammer, the bell and the platen. Fig. 3 is an end view of Fig. 2 with the platen and bell removed. Fig. 4 is a perspective view of one of the paper guides removed. Fig. 4$^a$ is a detail showing the application of the paper guide. Fig. 5 is a face view of the ribbon spool gear wheel. Fig. 6 is a central, sectional view through the ribbon spool. Fig. 7 is a view of the opposite face of the ribbon-spool gear-wheel. Fig. 8 is a perspective view showing a portion of the carriage frame with its means for holding it against movement when desired. Fig. 9 is an enlarged perspective detail showing the manner of locking the carriage against movement in all directions. Fig. 10 is an end elevation of the paper table and margin-guard. Fig. 11 is a top plan of the same. Fig. 12 is a view of the reverse side of Fig. 11. Fig. 12$^a$ is an enlarged perspective view of the margin-guard removed. Fig. 13 is a plan of the base and key-levers showing the improved means for locking the levers against movement. Fig. 14 is a vertical cross-section on the line 14—14 of Fig. 13. Fig. 15 is a side elevation showing the spring drum and its band and the yielding abutment thereon. Fig. 16 is a side elevation of a key-lever and the improved dog or pawl-mechanism with the parts in the position they assume when the key is up. Fig. 17 is a detail plan of the rack-bar with the dogs in the position they assume when the key lever is up. Fig. 18 is a similar view to Fig. 16 with the key-lever down. Fig. 19 is a view like Fig. 17 showing the parts in the position they assume when the key-lever is down. Fig. 20 is an end elevation of the means for temporarily locking the paper table in an upright position to facilitate easy removal of the platen. Fig. 21 is a detail showing the parts in their other position. Fig. 21ª is a sectional detail which will be hereinafter more particularly referred to. Fig. 22 is a plan of the dog-mechanism shown in Figs. 16 and 18. Fig. 23 is a view looking in the direction of the arrow in Fig. 22. Fig. 24 is a perspective detail of the packing clamp and lug for fastening the machine on the base or packing case. Fig. 25 is an enlarged perspective view of the clamp detached.

Like letters of reference indicate like parts in all the figures of the drawings in which they appear.

Referring to the drawings by letter A designates a portion of the base or frame of a type-writing machine of any well known or approved form of construction except as hereinafter specified.

$A'$ is the platen and $a$ are its journals suitably supported in the end-plates $a'$ as seen in Figs. 1 and 2. One of these journals is extended as seen in Fig. 2 and carries the bell $A^2$ which is connected therewith in any suitable manner.

$A^3$ is the bell hammer in one piece with its arm $A^{3\times}$ which is connected with one of the end plates or uprights $a'$ as at $a^2$, and $a^3$ is the trip pivoted on the hammer as at $a^4$ and arranged to normally hang pendent as seen in Fig. 2. This trip near its upper end abuts against the spring $A^4$, suitably secured or held to the upright $a'$, as for instance by being coiled around and held by the screw $a^5$. See Fig. 3. A pin or stud $a^6$ rigid with and projecting laterally from the upright $a'$, extends beneath the spring between its ends and prevents said spring from impelling the hammer too far.

$A^5$ is the bell-trip-operating-pin. The hammer stands normally as shown in Fig. 2 with the trip $a^3$ pendent and the free end of the hammer away from the bell. This trip is pivoted on the hammer and when it comes in contact with the pin $A^5$, the whole mechanism will rest on the pivot of the bell hammer and tension the spring $A^4$ as seen in Fig. 3. After the trip slides over the pin the hammer is impelled by the tension of the spring and causes the bell to ring. The spring thus impels the hammer and offers a yielding abutment for and actuates the trip $a^3$. The pin or stud $a^6$ should be so arranged relatively to the other parts as to permit the spring to impel the hammer with the proper force and to the proper distance and yet prevent impelling the hammer too far. As will be readily understood from Figs. 2 and 3 when the spring $A^4$ strikes the pin $a^6$, it produces a momentum which carries the hammer sufficiently far to cause its free end to engage the bell and cause a ringing.

In Fig. 4 I have shown an improved paper guide, two or more of which may be employed around the platen in the position shown in Fig. 1. This paper guide B is formed preferably of sheet metal, substantially in the shape seen in Fig. 4 being provided with a base or portion $b$ designed to fit and to be secured to the back of the carriage as usual. This base or portion $b$ has slots $b'$ extending in the direction of the length of the guide which are for the purpose of readily placing or inserting the guide on the machine, the screws which are to be used for retaining the guides in position being preferably made with square heads or otherwise formed so as to be turned down with a wrench as the position in which they are placed is not favorable to the use of the screw driver for this purpose. In applying the guide the screws are first assembled in the carriage and the guide then inserted into place with the slots thereof receiving the bodies of the screws as seen in Figs. 2 and 4ª which are then fastened to hold the guide rigidly in position. The slots permit of adjustment of the guides forward or backward to suit the particular requirement. The guide is formed at its lower end in proximity to the portion $b$ with an extension $b^2$ which is provided for the purpose of meeting the bight of the platen and the back roll so that the paper cannot possibly get away.

Referring now to Figs. 5, 6 and 7 C designates the ribbon spool and $C'$ its gear wheel. The ribbon spools and their gears are mounted as usual on a shaft $c$ upon either side of the lock standard as seen in Fig. 1. Each spool carries a pin $c'$ suitably supported therein with its end extended upon each side of the spool outside the heads thereof as seen in Figs. 1 and 6, the extended portion being suitably shaped as with a slight enlargement as seen in Fig. 6 to engage the spring on the gear wheel which is now to be described. This spring $C^2$ which may be of any suitable material of the required shape and having the desired amount of resiliency, is somewhat in the form of the letter U extended or flattened, the right angled ends $c^2$ of which are passed through small holes $c^3$ in the gear wheel and then turned over as seen in Fig. 7 to retain the springs in place. There are preferably two of these springs in each gear wheel one upon each side of the shaft upon which it is supported and these springs intersect the enlarged or oblong holes $C^3$ in the gear wheel as seen in Figs. 5 and 7 and are adapted to latch the pin $c'$, so that when the spool with its pin $c'$ is forced into the hole $C^3$, the pin will be caught by its neck and held automatically in place with freedom for slight play. These springs pull down slightly upon the pin $c'$ of the spool and thereby cause a slight friction of the spool on its shaft which occasions a slight drag, preventing a too-rapid unwinding of the ribbon while the machine is being operated, forming as it were a slight frictional brake for regulating the unwinding of the ribbon from the spool.

In packing a type-writer for shipment besides the key-levers and type-bars it is necessary to secure the carriage against movement and in Figs. 8 and 9 I have shown a most simple and efficient means for this purpose. Attention is directed to said figures in which D represents a portion of the front of the machine frame and $d$ are lugs upon opposite sides thereof. D' is a transverse rod held in said lugs and is for the purpose usually of preventing the carriage from being lifted off of the machine when the paper is pulled off the platen, the shoe or hook $d'$ acting in the usual manner. The rod D' is screw-threaded at each end to receive the nuts $D^2$. $D^3$ are slotted clamp-pieces having a portion sleeved upon said rod and these clamps are held upon said rod in the desired position by means of the hooked screws $D^4$ which are screwed into the slotted portions of the clamps as seen best in Fig. 9 and their upper ends turned horizontally and at right angles to the length of the screws. These horizontal portions $d^4$ are adapted to engage holes in each end of the carriage, one of which is seen in Fig. 9, and when it is desired to secure the carriage against movement in all directions these hooked ends are engaged in the said holes on the ends of the carriage as indicated in Fig. 9, slightly lifting the carriage so as to elevate the carriage truck-wheel off the base when the nuts $D^2$ are tightened and the carriage is held against movement in all directions. When the machine arrives at its destination or when it is desired to release the carriage from the restraint from this shipping and carriage-holding device the nuts $D^2$ are loosened and the hooked ends of the screws are removed from the holes in the carriage which leaves the latter free to be acted upon by the motive power of the machine in the usual way.

In Figs. 10, 11, 12 and $12^a$, I have shown a marginal gage or guide for the insertion of paper into the carriage to secure a uniform margin on a number of sheets by guiding the left edge of the paper against the said gage. Referring to said figures E designates the paper table. Upon the back of this paper table is a rod E' supported in the lugs $e$ on the back of said table, and upon this rod is frictionally held the gage $E^2$. This frictional engagement is effected by means of a spring $e'$ located within a suitable recess in the body of the gage as seen in Fig. $12^a$ and bearing upon the upper side of the rod E' which passes through a suitable hole $e^2$ in said body portion of the gage. It will be readily seen how the gage can be manually moved to any desired point on the rod and temporarily held where placed by the frictional engagement of the spring upon the rod. Slight pressure upon the gage in the direction of the length of the rod is all that is required to move the gage to the desired position to give the required margin. The gage has an inclined or curved slot $e^3$ as seen in Fig. 12 to engage the upper edge of the paper table as seen in Fig. 10, to prevent undue movement of the gage back and forth at right angles to the length of the paper table.

In shipping type writers it is necessary or desirable to secure the key levers and type-bars against movement and in order to do this without the requirement of springs, paper and the like I have devised a simple means which is illustrated in Figs. 13 and 14. In these views F is a portion of the frame of the machine and F' the key-levers. $f$ is the bar which extends across the machine and beneath which the key-levers work and which limits their upward movement in the usual manner. $F^2$ is a bar, rod or piece of material extended beneath all of the key-levers and having its ends bent at right-angles and passed upward through openings in the base of the machine with their upper ends screw-threaded to receive the nuts $f'$ as seen best in Fig. 14. Normally the horizontal portion of the rod $F^2$ is at its lowest limit, i. e., below the lowest point of depression of any of the key-levers, the tops of the nuts being substantially flush with the top of the vertical portions of the rod as seen in Fig. 13.

When the machine is to be packed and it is desired to secure the key-levers and the type-bars which are connected together, against movement the nuts $f'$ are turned until the transverse portion of the bar $F^2$ is pulled up against the under side of the key-levers until their upper faces engage the cross-bar $f$ and when this is done it will be readily seen how the key-levers and type-bars are held under restraint. This device may be readily attached to type-writers now in use at very little expense.

In Fig. 15 I have shown a means for preventing shocks to the main spring whereby the latter is saved from injury or breakage. G is the usual spring barrel and G' is the chain which at its end carries the chain-piece $g$ adapted to enter an aperture $g'$ in the piece $g^2$ which is a part of the carriage and which is shown in Fig. 20. $G^2$ is a spring preferably a coiled spring, riding loosely upon the chain G' as seen in Fig. 15, and $g^3$ is a stud fixed in the base adjacent to the spring barrel. When the chain is accidentally let go the spring $G^2$ is carried along until it comes in contact with the stud $g^3$ when the chain-piece $g$ comes in contact with said spring and gradually compresses the same so that the shock of the moving pieces is broken and the main spring saved from injury or breakage.

In Figs. 16, 17, 18, 19, 22 and 23 is shown my improved dog or pawl mechanism. H designates the dog or pawl holder having two openings $h$, one upon each side of a central portion $h'$ and with suitable holes $h^2$ through which may pass the screws or other means employed for securing it in position. I and I' are the dogs each rigid with a shaft $i, i'$ respectively and mounted for movement independently of the other. These shafts are suitably supported in the dog-holder preferably adjustably as by the adjusting screws H' as seen in Fig. 22. $H^2$ are coiled springs around the shafts of the dogs with one end secured to a dog and the other bearing against the holder as seen in Fig. 22. These springs serve to force or spring the dogs forward into engagement with the rack bar I². The dog I is a straight dog and is the one which meshes with the rack when the carriage is at rest normally. It is provided upon its front face with a lug $i^2$ to limit the movement thereof by engagement with the holder H. The dog I' is what I term an angle dog, being provided with an extension $i^3$ below its pivot and carrying preferably at its outer end an anti-friction roller $i^4$, to reduce the friction when actuated by the button-headed screw $j$ which rises from the universal bail J to the rear of its pivot as seen in Figs. 16 and 18, the universal bail being pivoted on the bail-shaft $j$ in the usual manner. Rising from said bail in front of its pivot is a pin or screw J' having an eccentric head as seen best in Fig 18. I provide this eccentric head so that the limit of the throw or movement of the tail of the dog I can be varied and adjusted by simply turning said screw in its bearings. J² is the key-lever pivoted at $j^2$ in the usual manner and carrying the keys J³. Fig. 16 shows the action of the mechanism just described when the key is up, and in Fig. 18 is shown the operation of the parts when the key is down. Fig. 19 shows the separation of the dog faces as determined by the separation of the rack-teeth. It will be observed that the separation of the dog faces is less than the separation of the rack-teeth respectively adjacent to the dog faces thus allowing a slight drop or fall of the dog when the key is depressed. This drop is a necessary and vital feature and the drop can be regulated, i. e., made greater or less by the end-screw H' as seen in Fig. 22. This drop is a movement for giving half the feed movement on the downstroke of the key and half on the upstroke. When a key is depressed, the actuating screw $j$ allows the angle dog I' as seen in Fig. 18, to spring forward into the rack while at the same time the actuating-screw J' forces the dog I out of engagement with the rack. In this connection the lesser separation of the dog faces as compared with the rack-teeth allows the rack and carriage to drop forward the difference of the separation and the dog I will consequently rest upon the apex of the next rack-tooth. When the key is allowed to come up again the actuating screw $j$ forces the dog I' out of engagement with the rack and as the dog I is sprung against the apex of the rack tooth, the release of the rack and carriage from the temporary restraint of the dog I' will cause the carriage to move forward until the face of a rack tooth is caught against the face of the dog I. When the drop is to be made less the end-screw H' is withdrawn slightly, and thus the separation of the faces of the dogs is made greater, and vice-versa. J⁴ is a spring connecting the rear end of the key-lever with some fixed part.

In Figs. 20, 21 and 21ª, is illustrated a simple device for temporarily locking the paper-table in an upright position to facilitate the easy removal of the platen. E is the paper-table mounted to turn on its bearings which are suitably retained in the end-pieces $c'$, and K is a shouldered stud having a threaded shank $k$ upon which is screwed the nut K' so as to maintain it in the carriage riser with freedom however to rotate. $k'$ is a spring arranged to act upon said stud to limit the rotation thereof. This stud K is preferably formed with a flat face $k^2$, as seen in Figs. 20 and 21 and the stud is so located with relation to the tail $e^\times$ of the paper table that when the flat side of the stud is presented to the paper table the spring L of the latter will pull the paper table into position as shown in Fig. 20. The said spring has one end attached to some fixed part of the machine and the other to the tail of the paper table. When it is desired to throw the paper-table into the position shown in Fig. 21 the table is simply pulled forward when the lower end will slide against the stud and slightly rotate it until the table is locked against the periphery of the stud which is held by spring $k'$ as shown in said Fig. 21.

It now remains only to describe the clamp for fastening the machine on the base-board or packing case. This is shown in Figs. 1, 24 and 25 and consists of a preferably sheet metal plate M having a right-angled flange $m$ provided with holes $m'$ for the reception of the screws or other means which are employed for securing it to the base board. Four of these are preferably employed for each machine. N are lugs on the sides of the base of the machine and projecting beyond the same, being provided upon their upper edges with vertical slots $n$ to receive the lower edge of the top cross-portion $m^2$ of the clamp as seen best in Fig. 22. The clamps are made a little shorter than the distance from the top of the lugs to the base board or bottom of the packing case so that the separation of the parts and the rubber feet or plugs may be allowed for.

When it is desired to take the machine out of the case or off the base board it is only necessary to loosen the clamp screws and throw the clamps out of the slots or cuts in the lugs and the machine will be released from its fastenings.

What I claim is—

1. The combination with a riser and a bell hammer pivoted thereto, of a trip pivoted on the hammer, a spring on the riser acting on the trip, and a lug or pin on the riser against which said spring bears between its ends, as and for the purpose specified.

2. A paper platen guide provided with an integral base with open-ended slots and an extension above the base and connecting the same with the curved portion of the guide.

3. A platen paper-guide formed of a single piece with curved body portion, a horizontal base provided with slots extending in the general direction of the guide and an extension between the base and the body portion, combined with adjusting screws passed through said slots as and for the purpose specified.

4. A type-writing machine provided upon its front rod with adjustable clamps having hooked ends for engaging and locking the carriage against movement in all directions, as set forth.

5. A type-writing machine provided upon its front rod with carriage locking means comprising clamps on the rod and hooked devices thereon to engage the carriage to hold it against movement in all directions, as set forth.

6. The combination with a type-writer carriage and the front rod, of slotted clamps on said rod and hooked screws in said clamps and adapted to engage the carriage frame and hold it against pivotal and longitudinal movement, as and for the purpose specified.

7. The combination with the carriage and the frame, of the transverse rod with threaded ends and nuts thereon, slotted clamps sleeved upon said rod, and hooked screws carried by said clamps and adapted to engage openings in the carriage frame and elevate the latter, as set forth.

8. The combination with the paper table and a rod upon a rear face thereof, of a margin-guide frictionally held upon said rod and having a slot to receive the top edge of the table, as set forth.

9. A margin guide provided with a hole for the passage of its support, a slot to receive the paper-table and a recess for the reception of a spring, substantially as specified.

10. In a type-writing machine having a cross-bar above the key levers, an adjustable bar having vertical end portions and having a portion extended beneath the key levers for holding the same against the cross-bar of the frame to prevent movement of said levers.

11. In a type-writing machine the frame of which has a cross-bar above the key-levers, means having a portion extended beneath the key levers and having provisions for vertical adjustment thereof into contact with the under side of said levers to force their upper faces against the cross-bar of the frame to lock said levers against movement, as set forth.

12. The combination with a type-writer frame and its key-levers, of a rod or bar supported in the base of the machine and having a portion extended beneath the key-levers and vertically adjustable, as set forth.

13. The combination with a type-writer frame and its key-levers, of a rod having a horizontal portion passed beneath the levers, vertical portions passed through the base of the frame, and adjusting nuts upon the upper ends of said vertical portions, as set forth.

14. In a type-writing machine, the combination with the spring-barrel and its chain or cord, of a spring loosely encircling the chain, and a stop in proximity to the barrel to engage said spring, as set forth.

15. The combination with a key-lever and universal bail, of independently-movable dogs, one of which has a lateral extension, and pins on the bail, one of which has an eccentric head, as set forth.

16. The combination with the key-lever and independently-movable dogs, one of which has an extension carrying a roller, and headed pins on the bail upon opposite sides of its pivot, as set forth.

17. In a type-writing machine, the combination with a movable paper-table, of means engaging the table beyond its pivot for temporarily locking the same in an elevated position, said means being mounted in position to be actuated in one direction by the movement of the table on its pivot, substantially as specified.

18. In a type-writing machine, the combination with a pivoted paper-table having a tail extension and movable means acting upon said extension, as and for the purpose specified.

19. In a type-writing machine, the combination with a movable paper-table, of a partially-rotatably mounted stud arranged to engage said table, as set forth.

20. In a type-writing machine, the combination with a movable paper-table, of a spring-actuated stud mounted for partial rotation to engage said table, as set forth.

21. In a type-writing machine, the combination with the frame having a lug with notched upper face, of a clamp having a portion to engage said notch, as set forth.

22. In a type-writing machine, the combination with the base having projecting lug with a notch upon its upper face, of a clamp having a securing flange and a portion to engage said notch, as set forth.

In testimony whereof I affix my signature in presence of two witnesses.

CHARLES SPIRO.

Witnesses:
  JULIUS E. LEVY,
  LUD. FREUDENTHAL.